United States Patent
McCague

(10) Patent No.: US 8,366,922 B2
(45) Date of Patent: Feb. 5, 2013

(54) EXCHANGEABLE MEDIA FILTER

(75) Inventor: Michael McCague, Escondido, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 391 days.

(21) Appl. No.: 12/762,632

(22) Filed: Apr. 19, 2010

(65) Prior Publication Data

US 2011/0062065 A1    Mar. 17, 2011

Related U.S. Application Data

(60) Provisional application No. 61/242,749, filed on Sep. 15, 2009.

(51) Int. Cl.
*B01D 27/02* (2006.01)
*B01D 24/00* (2006.01)

(52) U.S. Cl. .................. 210/167.13; 210/232; 210/282; 210/315

(58) Field of Classification Search ............ 210/167.11, 210/167.12, 167.13, 175, 181, 203, 206, 210/232, 263, 282, 287, 315, 457
See application file for complete search history.

(56) References Cited

U.S. PATENT DOCUMENTS

| | | | |
|---|---|---|---|
| 4,361,471 A | 11/1982 | Kosarek | |
| 4,455,227 A | 6/1984 | Harms, II et al. | |
| 4,559,138 A | 12/1985 | Harms, II | |
| 4,561,979 A | 12/1985 | Harms et al. | |
| 4,608,247 A | 8/1986 | Heinig, Jr. | |
| 4,828,698 A | 5/1989 | Jewell | |
| 5,151,180 A * | 9/1992 | Giordano et al. | 210/264 |
| 5,174,896 A | 12/1992 | Harms, II | |
| 5,196,119 A | 3/1993 | Harms et al. | |
| 5,316,677 A | 5/1994 | Harms, II | |
| 5,352,369 A | 10/1994 | Heinig, Jr. | |
| 5,660,802 A | 8/1997 | Archer et al. | |
| 5,772,896 A | 6/1998 | Denkewicz, Jr. et al. | |
| 5,779,913 A | 7/1998 | Denkewicz, Jr. et al. | |
| 5,855,777 A | 1/1999 | Bachand et al. | |
| 5,858,246 A | 1/1999 | Rafter et al. | |
| 5,910,247 A * | 6/1999 | Outterside | 210/487 |
| 6,019,893 A | 2/2000 | Denkewicz, Jr. et al. | |
| 6,165,358 A | 12/2000 | Denkewicz, Jr. et al. | |
| 6,200,487 B1 | 3/2001 | Denkewicz, Jr. et al. | |
| 6,254,894 B1 | 7/2001 | Denkewicz, Jr. et al. | |
| 6,627,074 B2 | 9/2003 | Lincke | |
| 6,761,827 B2 | 7/2004 | Coffey | |
| 6,849,214 B2 * | 2/2005 | Patil | 264/45.1 |
| 6,982,040 B2 | 1/2006 | Costa et al. | |
| 7,067,056 B2 | 6/2006 | Collins | |

(Continued)

FOREIGN PATENT DOCUMENTS

EP    0269261 A1    1/1988

OTHER PUBLICATIONS

Form PCT/ISA/210 in connection with PCT/US2010/031945 dated Dec. 24, 2010.
Form PCT/ISA/237 in connection with PCT/US2010/031945 dated Dec. 24, 2010.
Form PCT/ISA/210 in connection with PCT/US2010/059515 dated Aug. 30, 2011.

(Continued)

*Primary Examiner* — Fred Prince
(74) *Attorney, Agent, or Firm* — Greenberg Traurig, LLP; Franklin D. Ubell

(57) ABSTRACT

A filter element for a pool or spa including a sintered plastic outer cylinder of a first diameter, a sintered plastic inner cylinder of a second diameter less than said first diameter; the inner cylinder being position coaxially with respect to the outer cylinder to define an annular interior chamber; and a selected granulated filter medium or combination of media residing in the annular interior chamber.

14 Claims, 9 Drawing Sheets

U.S. PATENT DOCUMENTS

| | | | |
|---|---|---|---|
| 7,138,054 B2 | 11/2006 | Harms et al. | |
| 7,147,786 B2 | 12/2006 | Costa et al. | |
| 7,208,083 B2 | 4/2007 | Meritt-Powell | |
| 7,211,176 B2 | 5/2007 | Hin et al. | |
| 7,238,278 B2 | 7/2007 | Coffey et al. | |
| 7,320,761 B2 | 1/2008 | Costa et al. | |
| 7,398,138 B2 | 7/2008 | Emery et al. | |
| 7,422,690 B2 | 9/2008 | Scharstuhl et al. | |
| 2002/0033365 A1* | 3/2002 | Patil | 210/501 |
| 2002/0092810 A1* | 7/2002 | King | 210/501 |
| 2003/0038093 A1* | 2/2003 | Gershenson | 210/767 |
| 2004/0104163 A1 | 6/2004 | Leaverton | |
| 2005/0056582 A1* | 3/2005 | Patel et al. | 210/266 |
| 2005/0067339 A1 | 3/2005 | McClure | |
| 2005/0161380 A1 | 7/2005 | Crawford | |
| 2005/0199551 A1 | 9/2005 | Gordon | |
| 2006/0027492 A1 | 2/2006 | Lin | |
| 2006/0219635 A1 | 10/2006 | McCague et al. | |
| 2007/0017877 A1 | 1/2007 | Musson | |

OTHER PUBLICATIONS

Form PCT/ISA1237 in connection with PCT/US2010/059515 dated Aug. 30, 2011.

Porous Plastic Water Liquids Filters, GenPore Site, Wayback Machine Internet Archive, Jul. 9, 2007, 2007 http://www.genpore.com/porous_plastic_water_li1quid_filters.htm, 1 Page.

Porous Plastic Sheet Description, GenPore site, Wayback Machine Internet Archive, Jul. 9, 2007 http://www.genpore.com/porous_plastic_sheet.htm, 3 Pages.

Harmsco Filtration Products Listing, Showing "Activated Carbon Filters" Link under HARMSCO Hurricane (R) Series, Wayback Machine Internet Archive, Feb. 3, 2003 http://www.harmsco.com/products.php, 1 Page.

Harmsco Hurrican, Activated Carbon Cartridges PDF Brochure, Wayback Machine Internet Archive, Feb. 3, 2003 http://www.harmsco.com/prod/Activated_Carbon_Final.pdf, 2 Pages.

* cited by examiner

EXCHANGEABLE MEDIA FILTER

This application claims the Paris Convention priority of U.S. Provisional Application No. 61/242,749 entitled "Exchangeable Media Filter" filed Sep. 15, 2009, the contents of which are hereby incorporated by reference in their entirety.

BACKGROUND OF THE INVENTION

1. Field of Invention

The subject disclosure relates to pools and spas and more particularly to improved methods and apparatus for filtering contaminants from pools and spas.

2. Description of Related Art

Portable spas have become quite popular as a result of their ease of use and multiplicity of features such as varied jet and seating configurations. One area where the inventor has recognized that ease of use could be enhanced is the area of maintaining proper water chemistry and sanitation.

SUMMARY

The following is a summary description of illustrative embodiments of the invention. It is provided as a preface to assist those skilled in the art to more rapidly assimilate the detailed design discussion which ensues and is not intended in any way to limit the scope of the claims which are appended hereto in order to particularly point tout the invention.

In an illustrative embodiment, water chemistry and sanitation are improved by installing a novel filter element in a filter compartment of a portable spa or tub In one embodiment, the filter element comprises a sintered plastic outer cylinder of a first diameter and a sintered plastic inner cylinder of a second diameter less than the first diameter. The inner cylinder is positioned coaxially with respect to the outer cylinder to define an annular interior chamber. A selected granular filter medium or media may then be placed in the annular chamber to combat one or more particular contaminants in the spa water.

In an alternative embodiment, a donut shaped bag containing selected filter media is placed in the annular chamber. In such an embodiment, the inner cylinder may be a suitable plastic mesh material and the bag may be adapted to hook over the inner cylinder.

DETAILED DESCRIPTION

Figure 1:
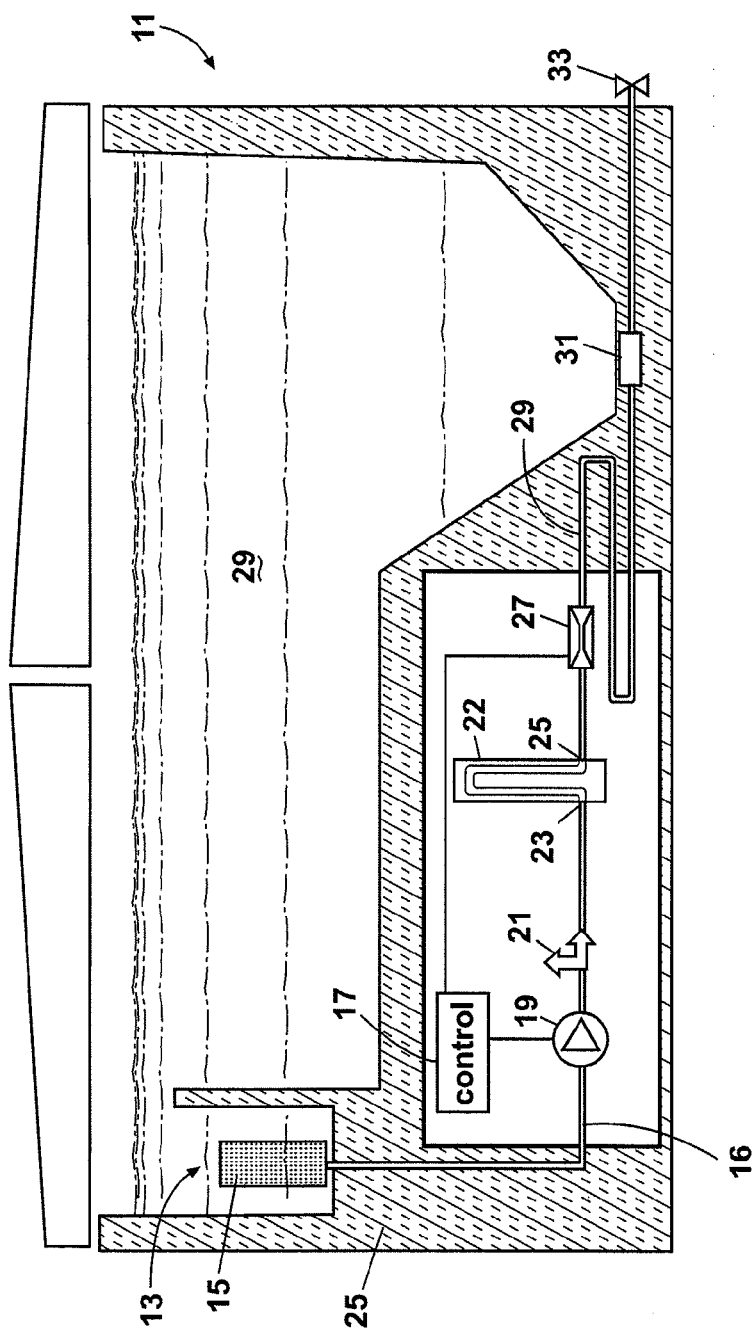
FIG. 1 is a schematic side sectional view of a portable spa.

FIG. 1 shows a first embodiment of a portable spa 11 containing an exchangeable media filter element 15. The spa 11 includes a water circulation, purification and heating system, which includes a filter compartment or "filter bucket" 13. In the system of FIG. 1, spa water 29 passes through a circulation pipe 16 to a circulation pump 19. A "T" junction 21 may be provided to supply water to a water feature such as a waterfall.

The circulation pump 19 further pumps the spa water through a "no fault" heater 22, with which are associated a regulating sensor 23 and a hi-limit sensor 25. An ozone generator and associated injector or other water purification apparatus 27 is also positioned in the return flow path to the spa 11, which may comprise an 8 to 10 foot contact chamber 29 and a spa inlet 31 where a circulation return jet is created. A secondary drain 33 may also be provided. An electronic control unit 17 controls the pump 19 and ozone generator 27, as well as other accessories which may be provided as part of the spa 11. In one embodiment, the filter bucket 13 may be a conventional filter bucket traditionally manufactured as part of the original spa equipment.

Figure 2:
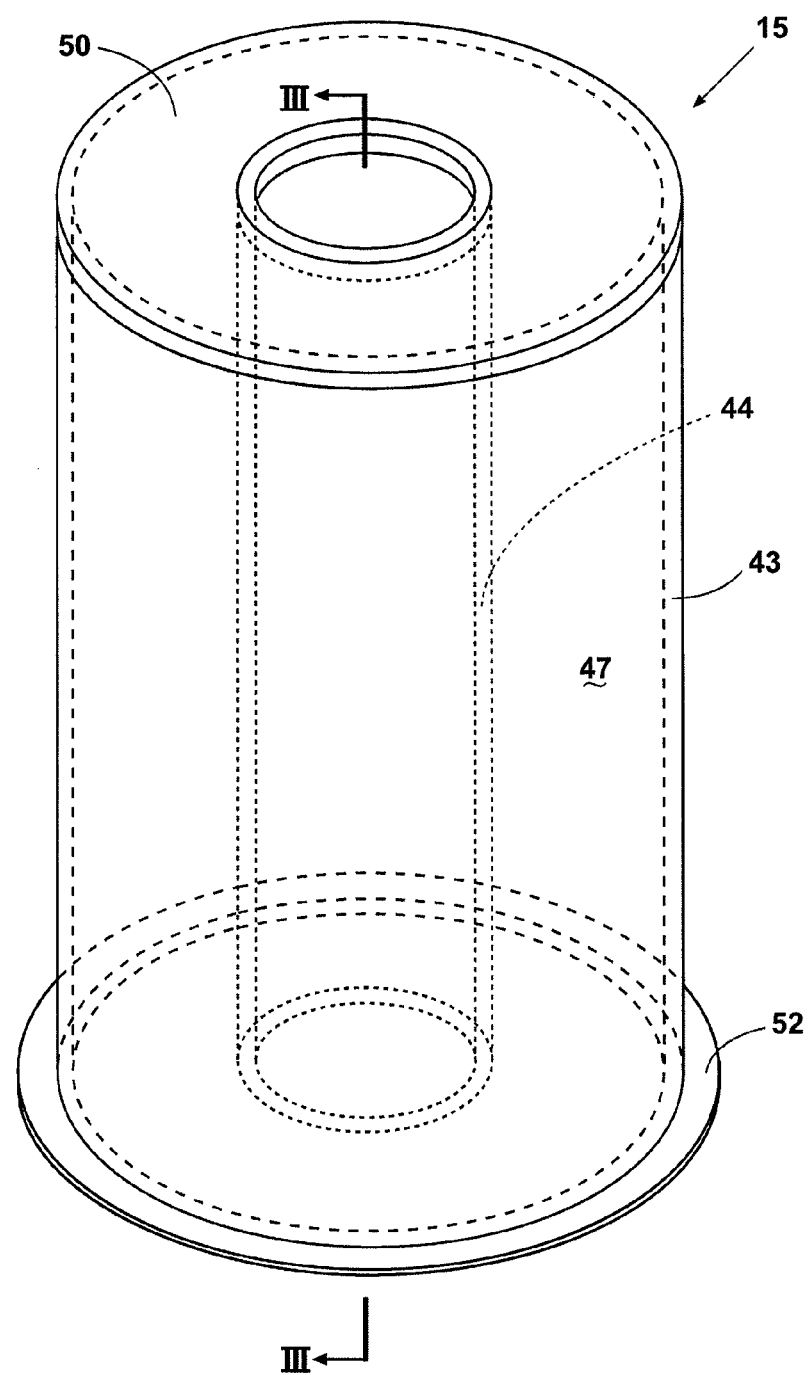
FIG. 2 is a perspective view of an exchangeable media filter according to an illustrative embodiment.
Figure 3:
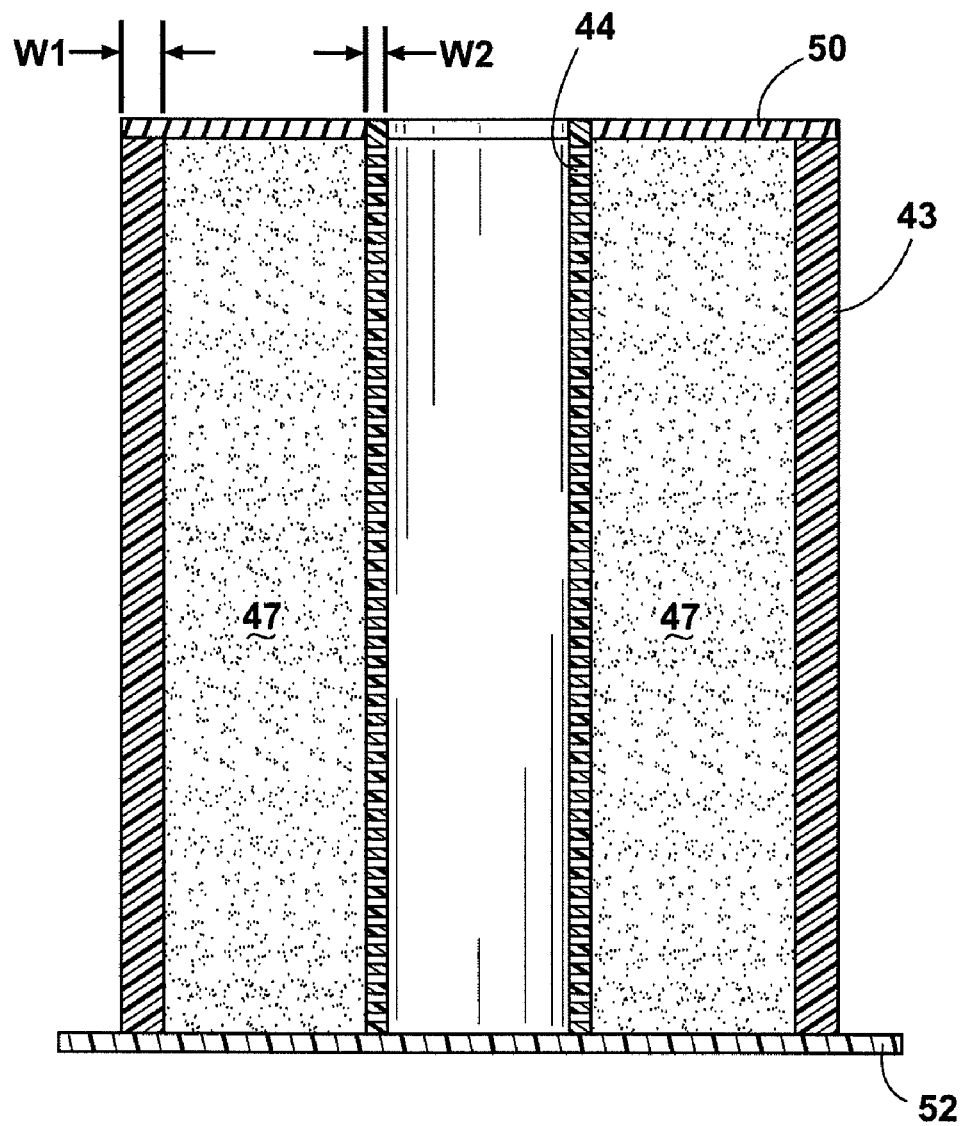
FIG. 3 is a side sectional view of the filter of FIG. 2 taken at 3-3 of FIG. 2.

An exchangeable media filter 15 according to an illustrative embodiment is shown in FIGS. 2 and 3. The filter 15 includes inner and outer co-axially mounted annular filter cylinders 43, 44 with a top cap 50 and a bottom cap 52. The cylinders 43, 44 are formed of sintered plastic, such as, for example, polypropylene or polyethylene. Other materials for the cylinders 43, 44 may include, for example, and without limitation, PTFE (poly tetrafluoroethylene), PVDF (poly vinylidene fluoride), EVA (ethyl vinyl acetate) Nylon, thermoplastic polyurethane. The top and bottom caps 50, 52 may be formed, for example, of plastisol, polyurethane, PVC, ABS, or Noryl, polypro, polyethylene, or chemically/thermally set plastic resin elastomer.

Presently preferred thicknesses $W_1$, $W_2$ for each of the cylinders range from 1/16" to 1/2" with an exemplary thickness of 1/8" for both $W_1$ and $W_2$. Porosity of the cylinders may range from 25 to 150 microns, with 100 microns being a typical porosity. While the filter 15 is cylindrical, other geometrical shapes, such as square or star-shaped could be employed. Various heights and outer diameters may also be employed, including diameters of conventional filter elements such as, for example, 8 to 20 inches tall and 5 to 12 inches in outer diameter.

The respective filter elements 43, 44 define an annular hollow inner chamber 47. The annular chamber 47 constitutes a space which is filled with a selected granulated or beaded medium or combination of granulated or beaded media. Such media may include, for example, and without limitation:

Ion exchange resin
De-ionization resin
Zeolite
Activated carbon
Silver based media
Ceramic
Solid sanitizer (chlorine/bromine)

After filling the chamber 47, the top cap 50 is fixed in place to close the unit. In operation, water flows radially from the outside larger diameter cylinder 43 to the inner cylinder 44, at a flow rate of e.g. 1-10 gallons per minute, thus bringing the water in contact with the active media. An advantage of the illustrative embodiment is that cylinders containing different filter media can be added or exchanged after the spa has been filled with water in response to occurrence of a problem with a particular type of contaminant.

In use, when a spa is filled with water, there is an amount of contamination already in the water. Through usage, chemical addition, evaporation, and water addition; waste and other toxic elements can build up in the water. Traditionally, it is recommended to change the water when the total dissolved solids (TDS) exceed 1500 ppm, or based on a days of use measure; for example, according to the formula [(Spa size in gallons)/3] (times) (number of bathers per day)=the number of days before water change is needed.

A filter constructed according to the illustrative embodiments serves to extend the life of the water, reduce the number of water changes and save water by removing the accumulated TDS from the water. Such TDS include: toxic metals such as lead, iron, copper, manganese, minerals, calcium, magnesium, sodium, chloride, soaps, detergents, foaming agents, oils, suntan lotions, cyanuric acid, ammonia, pesticides, pharmaceuticals, organic acids, beer/wine, components of human sweat and waste, chlorinated by-products, humic acid, urine, body fluids, and tannins.

Figure 4:
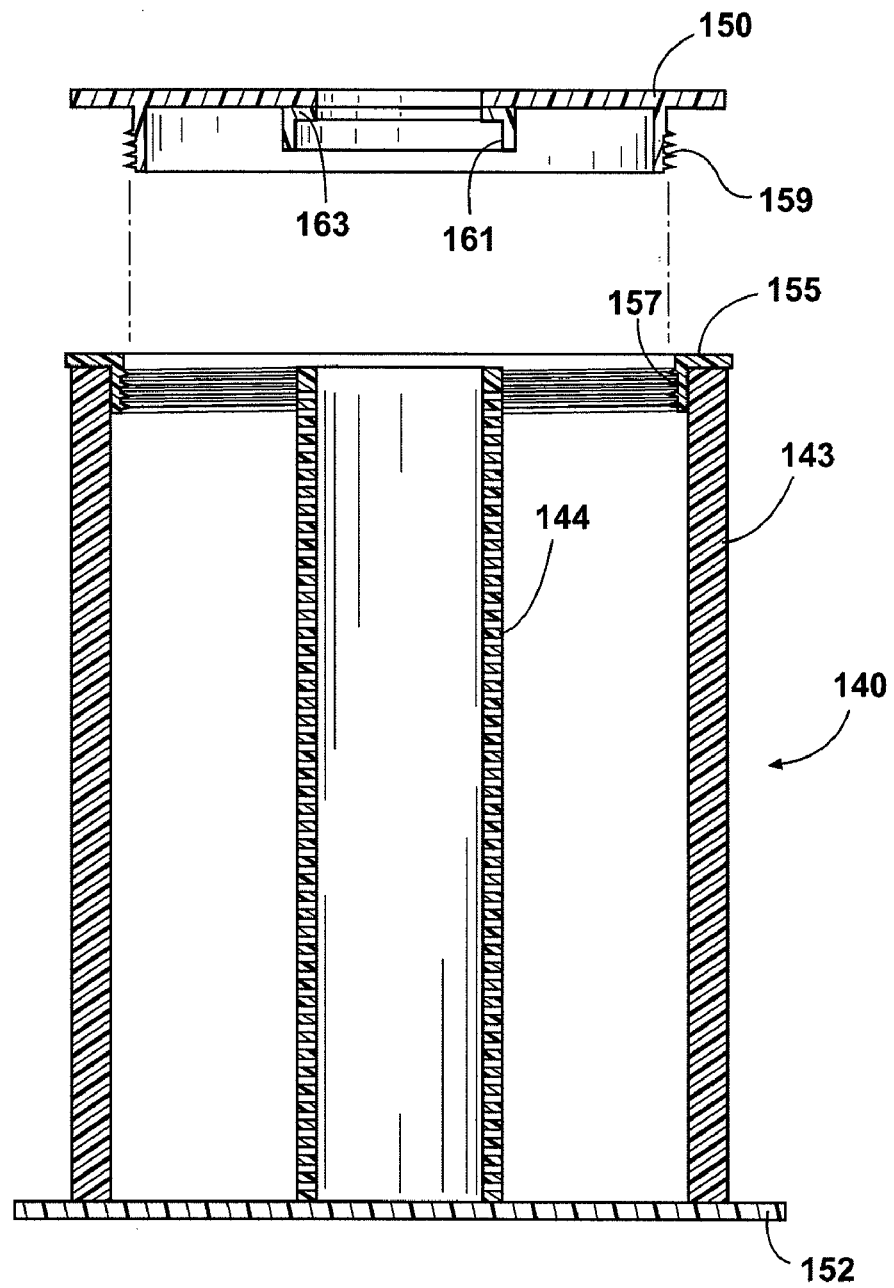
FIG. 4 is a side sectional view of an alternate embodiment.

In an alternative embodiment, a screw-on cap is provided on a filter like that of FIG. 1, enabling a user to change the media. In such case, the filter is removed from the spa, the top is unscrewed, and the media is replaced. In some embodiments the media may be limited to consumer friendly media like carbon, resin beads, and zeolites. As illustrated in FIG. 4, such an embodiment may comprise two cylinders 143, 144 with a potted bottom cap 152. A ring 155 with internal threads 157 is provided, which is seated and bonded to the top of the outer cylinder 143. The top cap 150 has external threads 159, which permits the top cap 150 to be screwed onto the top of the filter 140 until an internal sealing surface 161 on an inner ring 163 of the top cap 150 contacts and seals with the inner cylinder 144.

Figure 5:
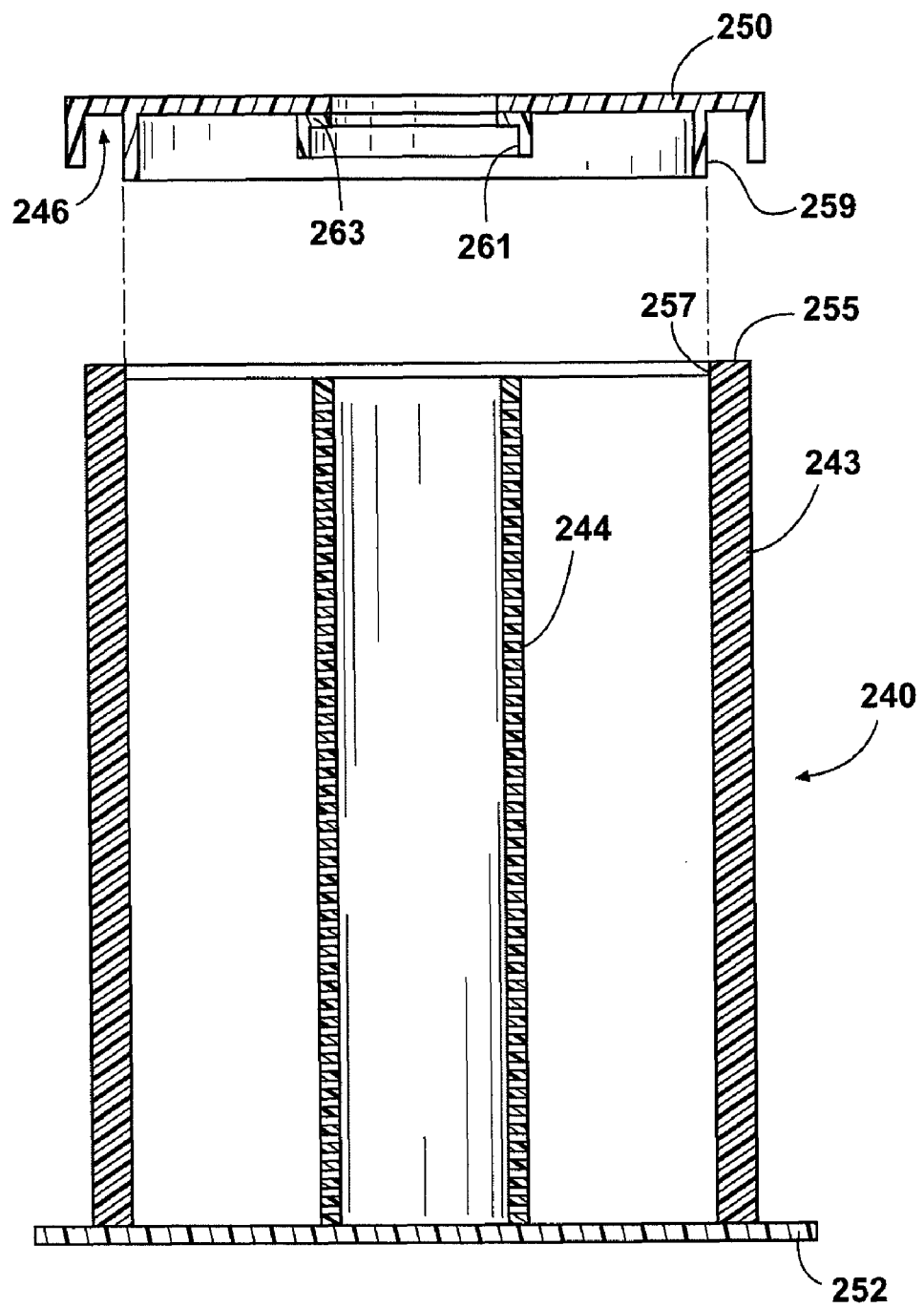
FIG. 5 is a side sectional view of an alternate embodiment.

In an alternative embodiment, a press-fit or friction fit, rather than screw-on, cap is provided on a filter like that of FIG. 2. As illustrated in FIG. 5, such an embodiment may comprise two cylinders 243, 244 with a potted bottom cap 252. The top cap 250 has a grooved surface 259, defining a groove 246, which is dimensioned to press fittingly engage surface 243. The internal sealing surface 261 on an inner ring 263 of the top cap 250 may also contact and press-fittingly seal with the inner cylinder 244.

Figure 6:
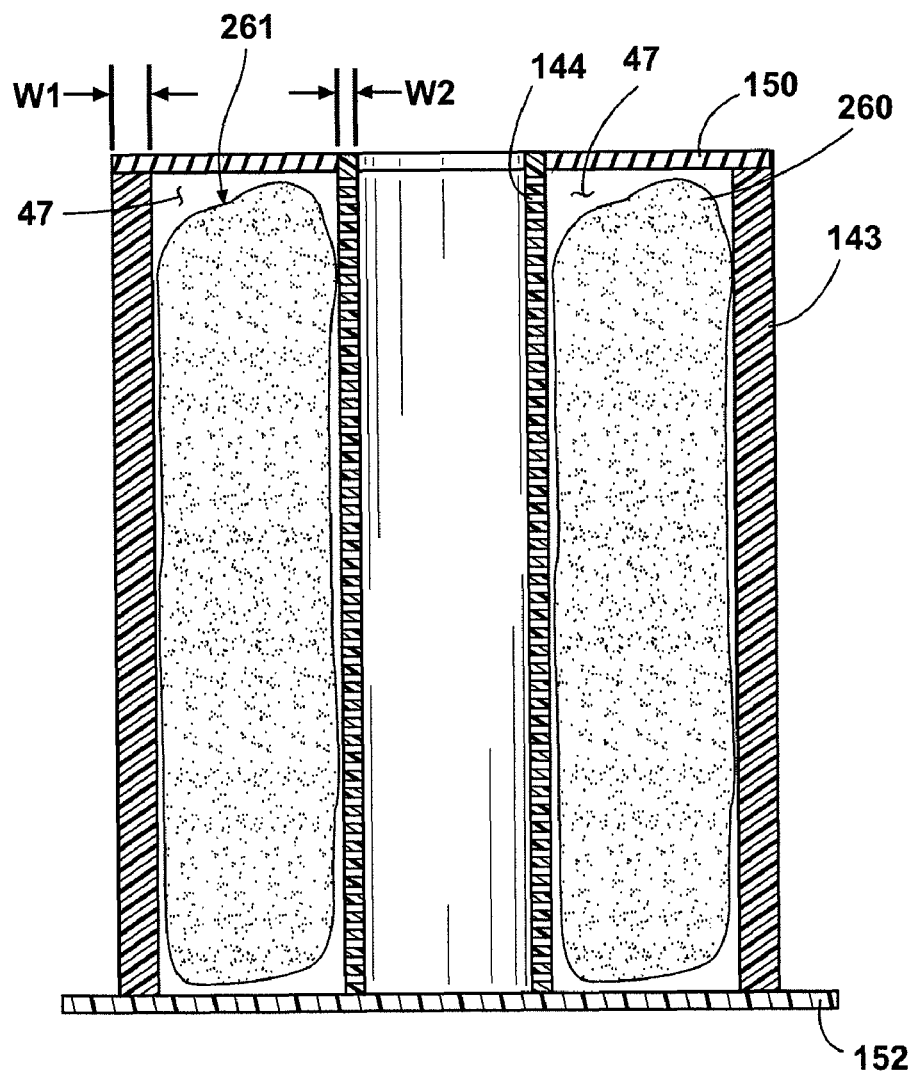
FIG. 6 is a side sectional view of an embodiment employing a resin filled bag.

FIG. 6 illustrates an embodiment wherein the filter media 260 is contained within a donut-shaped or annular crossectioned bag 261 formed of a suitable water permeable, porous material. Such material may comprise, for example, polypropylene, polyester, cotton, rayon, polyethylene, nylon, PTFE (Teflon), ployacrylonitrile, or acrylic. In various embodiments, the fabric type may be woven, nonwoven, felt, or mesh of a thickness of, for example, 0.01"-0.25". Illustrative porosities range from 10 mirons to 500 microns.

Figure 7:
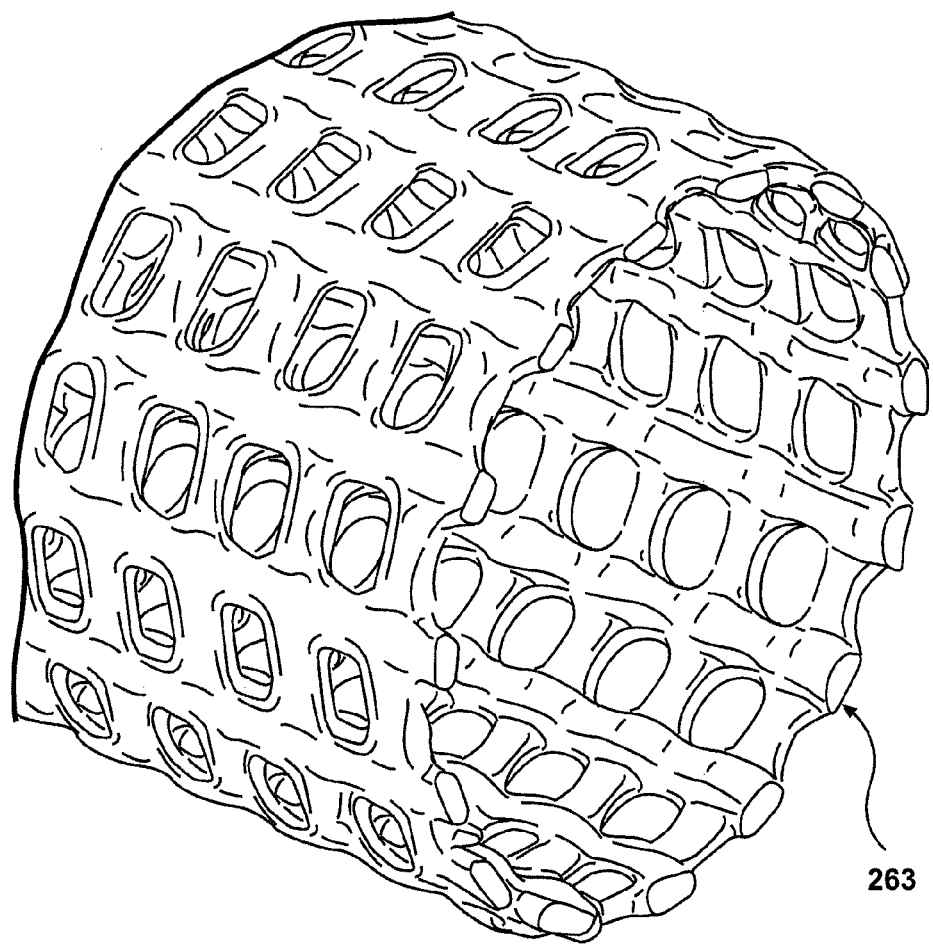
FIG. 7 is a perspective view illustrating a mesh structure forming an inner cylinder in one embodiment.
Figure 8:
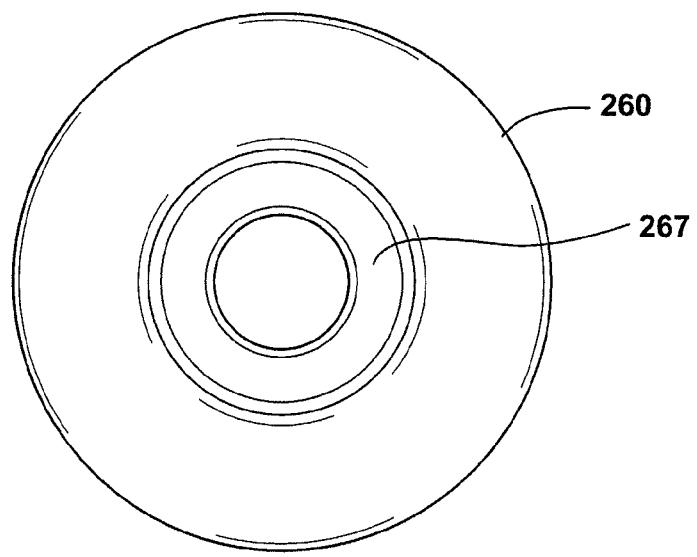
FIG. 8 is a top view of a resin filled bag with a top hook feature.
Figure 9:
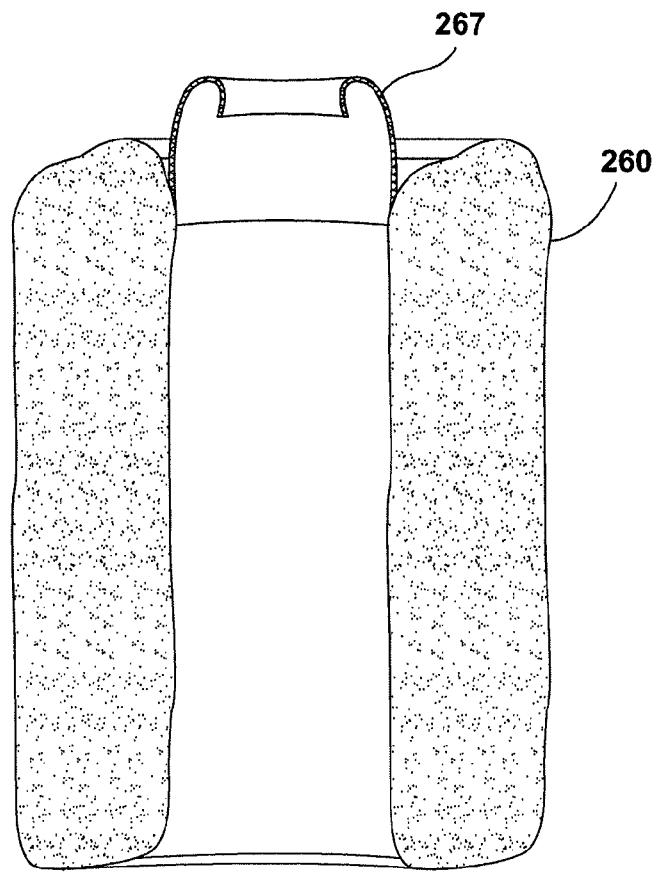
FIG. 9 is a side sectional view of the bag of FIG. 8.
Figure 10:
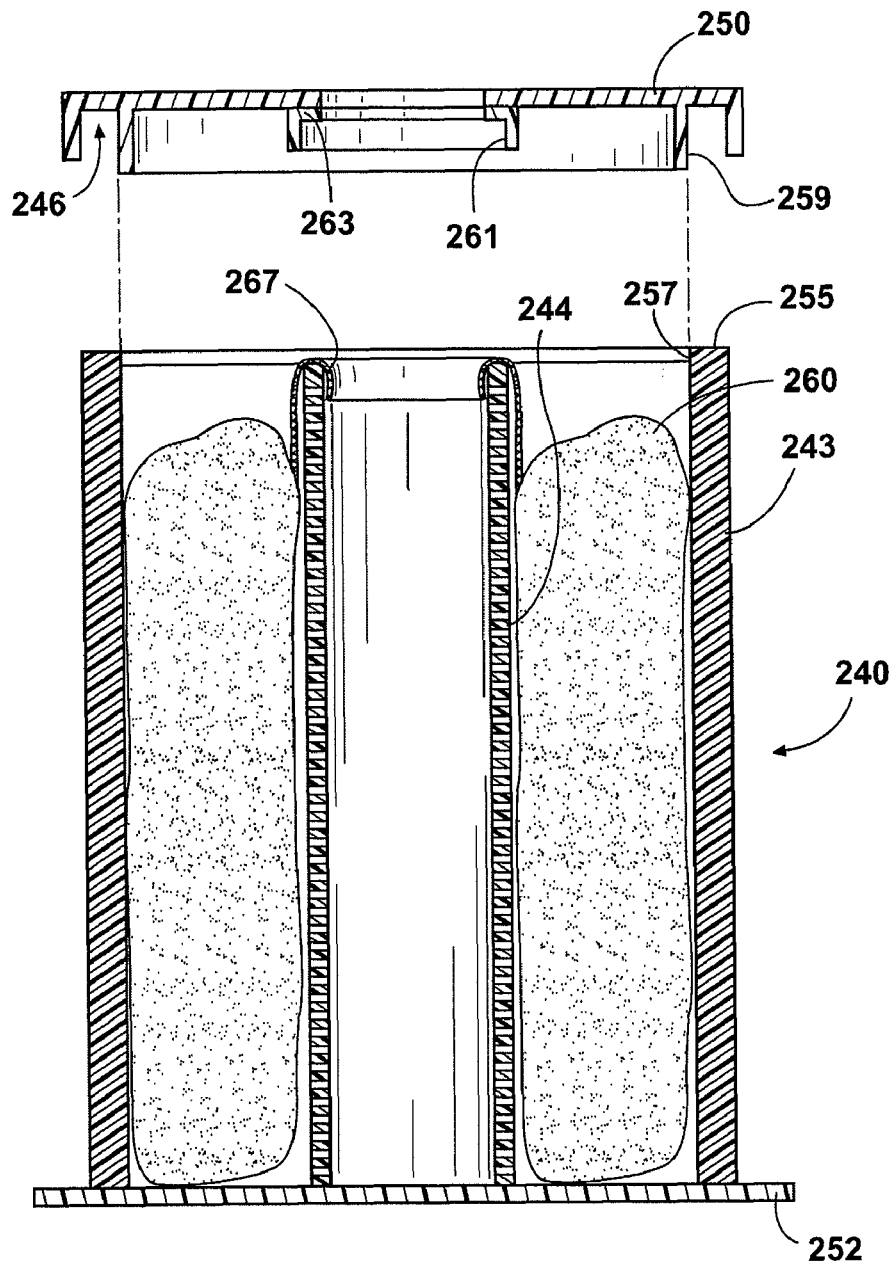
FIG. 10 is a side sectional view of a media filter embodiment employing the bag of FIGS. 8 and 9.

In an embodiment such as FIG. 6, the inner cylinder 144 may comprise a plastic net/mesh material 263 as shown in FIG. 7, such as, for example, part No. 2370 as manufactured by Industrial Netting, Minneapolis, Minnesota. Additionally, in one embodiment, shown in FIGS. 8 and 9, the donut bag 261 may have a fabric flange, flap, or hook 267 formed as a part thereof or attached thereto for purposes of slipping over the top rim or edge of an inner filter core. Thereafter, a top cap can be installed to hold the bag 260 in place, as illustrated in FIG. 10. In one embodiment, an inner core or cylinder 244 of reduced height may be employed to accommodate the thickness of the fabric hook 267.

Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. Apparatus comprising:
   a portable spa or tub;
   a filter compartment in said spa or tub;
   a filter element positioned in said filter compartment, the filter element comprising:
   a sintered plastic outer cylinder of a first diameter;
   a sintered plastic inner cylinder of a second diameter less than said first diameter; the inner cylinder being position coaxially with respect to the outer cylinder to define an annular interior chamber; and
   a selected granulated filter medium or combination of granulated filter media residing in said annular chamber.

2. The filter element of claim 1 further comprising a screw-on top cap threadable into and out of said filter whereby the cap may be removed and the filter media replaced.

3. The filter element of claim 1 further comprising a press-fitted top cap engaging the inner and outer cylinders.

4. A filter element for a pool or spa comprising:
   an outer cylinder of a first diameter;
   an inner cylinder of a second diameter less than said first diameter; the inner cylinder being position coaxially with respect to the outer cylinder to define an annular interior chamber; and
   a porous donut-shaped bag containing a filter medium or combination of selected filter media, said donut-shaped bag residing in said annular interior chamber.

5. The filter element of claim 4 wherein the outer cylinder comprises sintered plastic.

6. The filter element of claim 5 wherein the inner cylinder comprises a mesh material.

7. The filter element of claim 4 wherein the inner cylinder comprises a mesh material.

8. The filter element of claim 4 wherein the donut shaped bag has a hook formed at an upper end thereof, said hook adapted to hook over a top edge of said inner cylinder.

9. Apparatus comprising:
   a portable spa or tub;
   a filter compartment in said spa or tub;
   a filter element positioned in said filter compartment, the filter element comprising:
   a plastic outer cylinder of a first diameter;
   an inner cylinder of a second diameter less than said first diameter; the inner cylinder being position coaxially with respect to the outer cylinder to define an annular interior chamber; and
   a porous donut shaped bag containing a selected granular or beaded filter medium or combination of selected granular and/or beaded filter media and residing in said annular chamber.

10. The filter element of claim 9 wherein the outer cylinder comprises sintered plastic.

11. The filter element of claim 10 wherein the inner cylinder comprises a mesh material.

12. The filter element of claim 9 wherein the inner cylinder comprises a mesh material.

13. The filter element of claim 9 wherein the donut shaped bag has a hook formed at an upper end thereof, said hook adapted to hook over a top edge of said inner cylinder.

14. Apparatus comprising:
a portable spa or tub;
a filter compartment in said spa or tub;
a filter element positioned in said filter compartment, the filter element comprising:
 a sintered plastic outer cylinder of a first diameter;
 a sintered plastic inner cylinder of a second diameter less than said first diameter; the inner cylinder being position coaxially with respect to the outer cylinder to define an annular interior chamber; and
 a selected granulated and/or beaded filter medium or combination of selected granulated and/or beaded filter media residing in said annular chamber.

* * * * *